US012129767B1

(12) United States Patent
Sage et al.

(10) Patent No.: US 12,129,767 B1
(45) Date of Patent: Oct. 29, 2024

(54) GAS TURBINE MOUNTING CONFIGURATIONS FOR BENDING MITIGATION

(71) Applicant: General Electric Company, Schenectady, NY (US)

(72) Inventors: Patrick S. Sage, Cincinnati, OH (US); Steven M. McDonough, Sunbury, OH (US); Mahesh Khandeparker, Bangalore (IN); Stephen G. Matava, Andover, MA (US); Shashi Alok, Bangalore (IN)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/333,328

(22) Filed: Jun. 12, 2023

(51) Int. Cl.
*B64D 27/12* (2006.01)
*F01D 25/28* (2006.01)

(52) U.S. Cl.
CPC ........ *F01D 25/28* (2013.01); *F05D 2220/323* (2013.01)

(58) Field of Classification Search
CPC ........ B64D 27/12; B64D 27/26; B64D 27/40; B64D 27/404; B64D 27/406; B64D 2027/266; B64D 2027/268; B64D 2027/262; B64D 2027/264; B64D 29/02; B64D 27/06; B64D 27/18; F01D 25/28
See application file for complete search history.

(56) References Cited

U.S. PATENT DOCUMENTS

| | | | | |
|---|---|---|---|---|
| 4,624,436 | A | 11/1986 | Cooney et al. | |
| 6,843,449 | B1 | 1/2005 | Manteiga et al. | |
| 8,128,021 | B2 | 3/2012 | Suciu et al. | |
| 8,727,268 | B2 | 5/2014 | Combes et al. | |
| 8,727,269 | B2 | 5/2014 | Stuart et al. | |
| 10,723,471 | B2 | 7/2020 | Stuart et al. | |
| 11,377,221 | B2 | 7/2022 | Sawyers-Abbott et al. | |
| 2011/0259997 | A1* | 10/2011 | Marechal | B64D 27/40 244/54 |
| 2021/0261262 | A1* | 8/2021 | Schelfaut | B64D 27/404 |
| 2021/0354838 | A1* | 11/2021 | Schelfaut | B64D 27/40 |

FOREIGN PATENT DOCUMENTS

| | | |
|---|---|---|
| EP | 3683148 | 10/2021 |

* cited by examiner

*Primary Examiner* — David E Sosnowski
*Assistant Examiner* — Maxime M Adjagbe
(74) *Attorney, Agent, or Firm* — Hanley, Flight & Zimmerman, LLC

(57) ABSTRACT

Gas turbine mounting configurations for backbone bending mitigations are described herein. An example gas turbine engine disclosed herein includes a pylon, an inlet to be subjected to an inlet load along an inlet load axis, a case assembly including a first case portion and a second case portion, a forward mount coupling the first case portion to the pylon, the coupling of the forward mount to the pylon defining a first line of action, an aft mount, and a thrust link coupling the second case portion to the pylon, the thrust link defining a second line of action, an intersection of the first line of action and the second line of action disposed at least one of: (1) on the inlet load axis and the centerline, (2) downstream of the inlet load axis and beneath the centerline, and (3) upstream of the inlet load axis and above the centerline.

18 Claims, 5 Drawing Sheets

GAS TURBINE MOUNTING CONFIGURATIONS FOR BENDING MITIGATION

FIELD OF THE DISCLOSURE

This disclosure relates generally to gas turbine engines and, more particularly, to gas turbine mounting configurations for bending mitigation.

BACKGROUND

Turbine engines are some of the most widely used power-generating technologies, often being utilized in aircraft and power-generation applications. A turbine engine generally includes a fan and a core arranged in flow communication with one another. The core of the turbine engine generally includes, in serial flow order, a compressor section, a combustion section, a turbine section on the same shaft as the compressor section, and an exhaust section. Typically, a casing or housing surrounds the core of the turbine engine.

Figure 1:
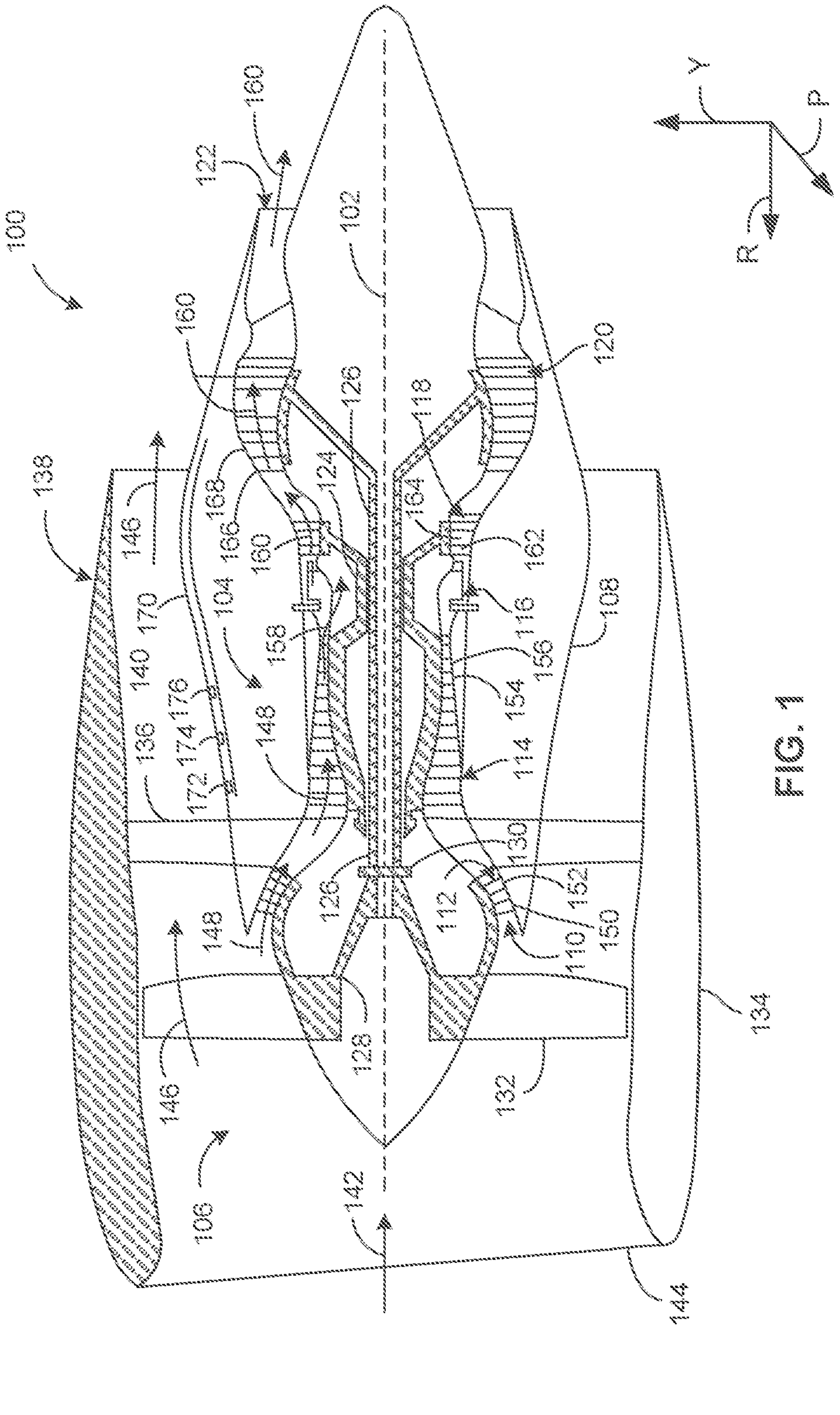
FIG. 1 is a cross-sectional view of a gas turbine engine in which examples disclosed herein may be implemented.

The figures are not to scale. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Some figures are depicted herein with parts that include cross-hatching to indicate such parts are illustrated in cross-section. To distinguish between different parts depicted in a figure, different cross-hatching patterns are applied to different parts. The different cross hatching patterns should not be interpreted as implying any characteristics regarding the part. Additionally, a same cross-hatching pattern used on different sheets should not be interpreted as implying any relationship between the parts with the same cross-hatching pattern.

In the following detailed description, reference is made to the accompanying drawings that form a part hereof, and in which is shown by way of illustration specific examples that may be practiced. These examples are described in sufficient detail to enable one skilled in the art to practice the subject matter, and it is to be understood that other examples may be utilized. The following detailed description is therefore, provided to describe an exemplary implementation and not to be taken limiting on the scope of the subject matter described in this disclosure. Certain features from different aspects of the following description may be combined to form yet new aspects of the subject matter discussed below.

DETAILED DESCRIPTION

Compressor blade tip clearances in gas turbine engines are reduced by operational distortions caused by the internal forces of the gas turbine engines. Particularly, thrust and aero-inlet loads can create an internal bending moment in the gas turbine engine, which causes the gas turbine engine to bend between mounts (e.g., mounting points to the locations, etc.) of the gas turbine engine. Examples disclosed herein include engine casing and/or mounting configurations that reduce backbone bending by causing the inlet load and thrust load to be applied in opposite directions, which reduces the net bending moment applied to the gas turbine engine.

A turbine engine, also referred to herein as a gas turbine engine, is a type of internal combustion engine that uses atmospheric air as a moving fluid. In operation, atmospheric air enters the turbine engine via a fan and flows through a compressor section in which one or more compressors progressively compress (e.g., pressurize, etc.) the air until it reaches the combustion section. In the combustion section, the pressurized air is combined with fuel and ignited to produce a high-temperature, high-pressure gas stream (e.g., hot combustion gas) before the gas stream enters a turbine section of the turbine engine. The hot combustion gases expand as they flow through the turbine section, causing the blades of one or more turbines to spin. The rotating blades of the turbine produce a spool work output that powers a corresponding compressor. The spool is a combination of the compressor, a shaft, and the turbine. Turbine engines often include a plurality of spools, such as a high-pressure spool (e.g., HP compressor, shaft, and turbine) and a low-pressure spool (e.g., LP compressor, shaft, and turbine). A turbine engine can include one spool or more than two spools in additional or alternative examples.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or as terms, such "about", "approximately", and "substantially", are not to be limited to the precise value specified. In some examples used herein, the term "substantially" is used to describe a relationship between two parts that is within three degrees of the stated relationship (e.g., a substantially colinear relationship is within three degrees of being linear, a substantially perpendicular relationship is within three degrees of being perpendicular, a substantially parallel relationship is within three degrees of being parallel, a substantially flush relationship is within three degrees of being flush, etc.).

The terms "upstream" and "downstream" refer to the relative direction with respect to fluid flow in a fluid pathway. For example, "upstream" refers to the direction from which the fluid flows, and "downstream" refers to the direction to which the fluid flows. Various terms are used herein to describe the orientation of features. As used herein, the orientation of features, forces and moments are described with reference to the yaw axis, pitch axis, and roll axis of the vehicle associated with the features, forces and moments. In general, the attached figures are annotated with a set of axes including the yaw axis Y, the roll axis R, and the pitch axis P. As used herein, the terms "longitudinal," and "axial" are used interchangeably to refer to directions parallel to the roll axis. As used herein, the term "lateral" is used to refer to directions parallel to the pitch axis. As used herein, the term "vertical" and "normal" are used interchangeably to refer to directions parallel to the yaw axis.

Cold blade tip clearances (e.g., blade tip clearances when the engine is not in operation, etc.) and the resulting operating clearances in the compressor and/or fan are often defined (e.g., designed, etc.) based on clearance closures during take-off (TO) rotation maneuvers (e.g., TO rotation maneuvers are the clearance pinch point for several locations/engine stages throughout the engine, etc.). That is, in some examples, the minimum blade tip clearances (e.g., closest clearances, etc.) in the fan, the compressor, the low-pressure turbine, and/or the high-pressure turbine occur during TO engine operation. As such, the minimum blade tip clearance at which the engine can operate at is based on the clearance reduction at a minimum clearance condition (also referred to as a "pinch point"), which generally occurs during takeoff (e.g., the takeoff flight stage, etc.). The clearance reductions at the pinch point can be caused by engine vibrations, axisymmetric closures due to thermal and mechanical component deflections, and distortion (e.g., strain, etc.) caused by operation of the engine. Operational distortion in an engine can be caused by internal forces in the engine from thrust and/or aero inlet loads. An engine body can bend between forward and aft mount attachment points of the engine to the aircraft. To prevent blade tip incursion with an engine casing, many compressors are designed to accommodate blade tip clearance reductions during takeoff. However, this accommodation also results in greater clearances during other flight phases, which reduces engine performance during these phases. As such, reducing the backbone bending from thrust and inlet loads enables compressors to have smaller (e.g., tighter, etc.) tip clearances, which increases engine performance (e.g., specific fuel consumption, thrust output, etc.) across phases of operation.

Example mounting and casing configurations disclosed herein mitigate these distortions by causing the inlet load bending moment and the thrust load bending moment to act in opposite directions. In some examples disclosed herein, a mounting configuration for a gas turbine engine includes a forward mount, an aft mount, and a thrust link. In some such examples disclosed herein, the forward mount defines a first line of action, and the thrust link defines a second line of action. As used herein, a "line of action" is a vector along which a force acts. In some such examples disclosed herein, the intersection of the first line of action and the second line of action is on the opposite side of a centerline of the gas turbine engine as the forward mount, the aft mount, the thrust link, and the pylon. In other such examples disclosed herein, the intersection of the first line of action and the second line of action is in front of applied inlet load. In some examples disclosed herein, during certain conditions/flight stages, such as takeoff, the bending moment associated with the thrust of the gas turbine and the bending moment associated with the inlet load are exerted in opposite directions, which reduces the net bending moment on the gas turbine engine.

Referring now to the drawings, wherein identical numerals indicate the same elements throughout the figures, FIG. 1 is a schematic cross-sectional view of a turbofan-type gas turbine engine 100 ("turbofan 100"). While the illustrated example is a high-bypass turbofan engine, the principles of the present disclosure are also applicable to other types of engines, such as low-bypass turbofans, turbojets, turboprops, etc. As shown in FIG. 1, the turbofan 100 defines a longitudinal or axial centerline axis 102 extending therethrough for reference. In general, the turbofan 100 may include a core turbine 104 or gas turbine engine disposed downstream from a fan section 106. FIG. 1 also includes an annotated directional diagram with reference to an axial direction A, a circumferential direction C, and a radial direction R.

The core turbine 104 generally includes a substantially tubular outer casing 108 ("turbine casing 108") that defines an annular inlet 110. The outer casing 108 can be formed from a single casing or multiple casings. The outer casing 108 encloses, in serial flow relationship, a compressor section having a booster or low pressure compressor 112 ("LP compressor 112") and a high pressure compressor 114 ("HP compressor 114"), a combustion section 116, a turbine section having a high pressure turbine 118 ("HP turbine 118") and a low pressure turbine 120 ("LP turbine 120"), and an exhaust section 122. A high pressure shaft or spool 124 ("HP shaft 124") drivingly couples the HP turbine 118 and the HP compressor 114. A low pressure shaft or spool 126 ("LP shaft 126") drivingly couples the LP turbine 120 and the LP compressor 112. The LP shaft 126 may also couple to a fan spool or shaft 128 of the fan section 106 ("fan shaft 128"). In some examples, the LP shaft 126 may couple directly to the fan shaft 128 (i.e., a direct-drive configuration). In alternative configurations, the LP shaft 126 may couple to the fan shaft 128 via a reduction gearbox 130 (e.g., an indirect-drive or geared-drive configuration).

As shown in FIG. 1, the fan section 106 includes a plurality of fan blades 132 coupled to and extending radially outwardly from the fan shaft 128. An annular fan casing or nacelle 134 (also referred to herein as the fan case) circumferentially encloses the fan section 106 and/or at least a portion of the core turbine 104. The nacelle 134 is supported relative to the core turbine 104 by a plurality of circumferentially-spaced apart outlet guide vanes 136. Furthermore, a downstream section 138 of the nacelle 134 can enclose an outer portion of the core turbine 104 to define a bypass airflow passage 140 therebetween.

As illustrated in FIG. 1, air 142 enters an inlet portion 144 of the turbofan 100 during operation thereof. A first portion 146 of the air 142 flows into the bypass airflow passage 140, while a second portion 148 of the air 142 flows into the inlet 110 of the LP compressor 112. One or more sequential stages of LP compressor stator vanes 150 and LP compressor rotor blades 152 coupled to the LP shaft 126 progressively compress the second portion 148 of the air 142 flowing through the LP compressor 112 en route to the HP compressor 114. Next, one or more sequential stages of HP compressor stator vanes 154 and HP compressor rotor blades 156 coupled to the HP shaft 124 further compress the second portion 148 of the air 142 flowing through the HP compressor 114. This provides compressed air 158 to the combustion section 116 where it mixes with fuel and burns to provide combustion gases 160.

The combustion gases 160 flow through the HP turbine 118 in which one or more sequential stages of HP turbine stator vanes 162 and HP turbine rotor blades 164 coupled to the HP shaft 124 extract a first portion of kinetic and/or thermal energy from the combustion gases 160. This energy extraction supports operation of the HP compressor 114. The combustion gases 160 then flow through the LP turbine 120 where one or more sequential stages of LP turbine stator vanes 166 and LP turbine rotor blades 168 coupled to the LP shaft 126 extract a second portion of thermal and/or kinetic energy therefrom. This energy extraction causes the LP shaft 126 to rotate, supporting operation of the LP compressor 112 and/or rotation of the fan shaft 128. The combustion gases 160 then exit the core turbine 104 through the exhaust section 122 thereof.

Along with the turbofan 100, the core turbine 104 serves a similar purpose and sees a similar environment in land-based gas turbines, turbojet engines in which the ratio of the first portion 146 of the air 142 to the second portion 148 of the air 142 is less than that of a turbofan, and unducted fan engines in which the fan section 106 is devoid of the nacelle 134. In each of the turbofan, turbojet, and unducted engines, a speed reduction device (e.g., the reduction gearbox 130) may be included between any shafts and spools. For example, the reduction gearbox 130 may be disposed between the LP shaft 126 and the fan shaft 128 of the fan section 106. FIG. 1 further includes a cowling 170 and offset-arch gimbals 172, 174, 176. The cowling 170 is a covering that may reduce drag and cool the engine. The offset-arch gimbals 172, 174, 176 may, for example, include infrared cameras to detect a thermal anomaly in the under-cowl area of the turbofan 100.

Figure 2:
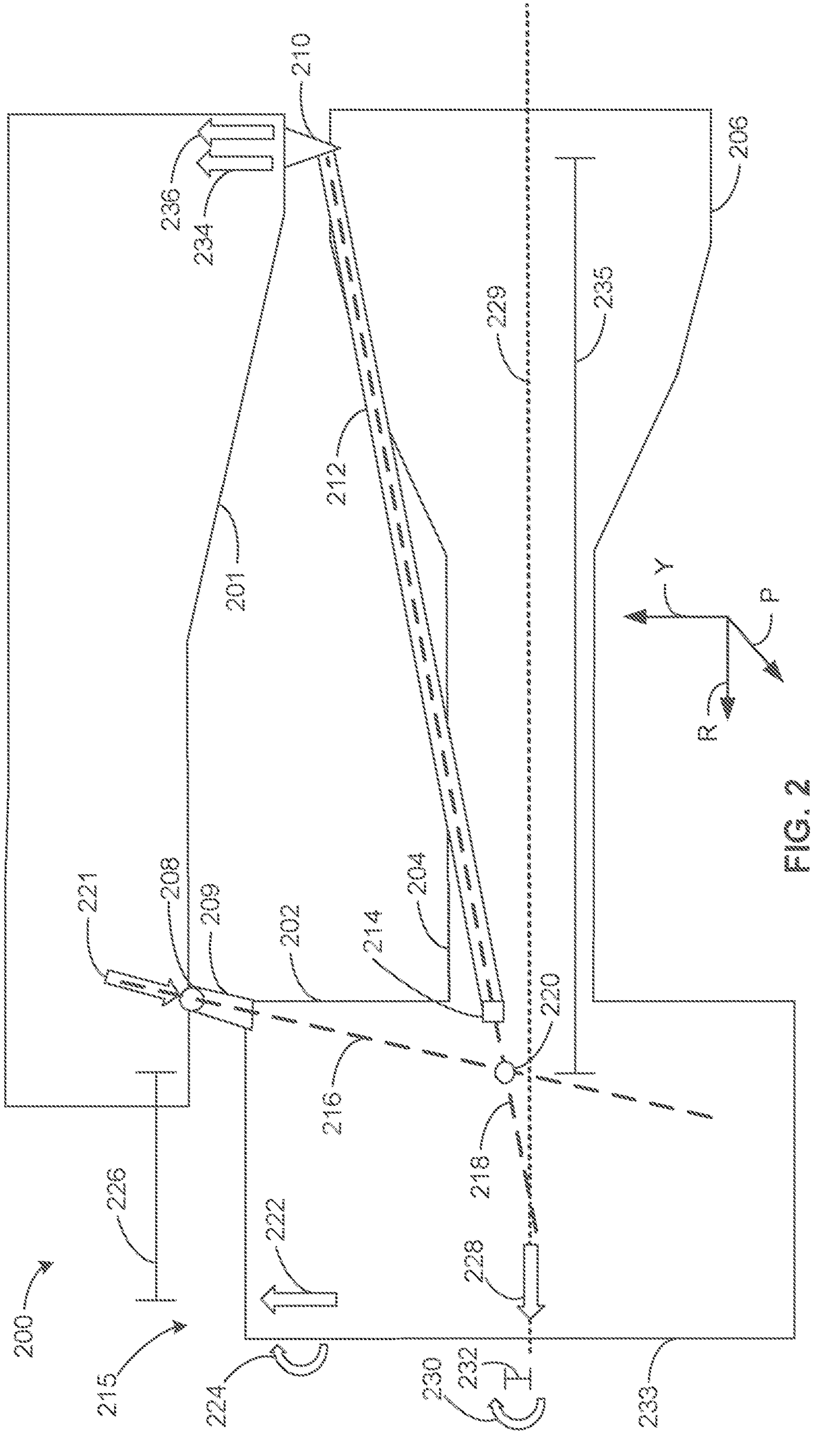
FIG. 2 (Prior Art)
FIG. 2 is a schematic view of a prior mounting configuration.

FIG. 2 is a side schematic view of a gas turbine engine 200 coupled to a pylon 201 including a first case portion 202, a second case portion 204, and a third case portion 206. In FIG. 2, the gas turbine engine 200 includes a forward mount 208, a strut 209, an aft mount 210, and a thrust link 212. In FIG. 2, the thrust link 212 extends between the aft mount 210 and a mount location 214 on the first case portion 202. In FIG. 2, the strut 209 and/or the forward mount 208 define a first line of action 216, and the thrust link 212 defines a second line of action 218. In FIG. 2, the first line of action 216 and the second line of action 218 have an intersection point 220.

The first case portion 202 includes the portion of the case of the gas turbine engine 200 that houses the turbomachinery components of the fan (e.g., the fan section 106 of FIG. 1, etc.), the fan frame, and/or the LP compressor of the gas turbine engine 200 (e.g., the LP compressor 112 of FIG. 1, etc.). In FIG. 2, the fan case portion includes the mount location 214 of the thrust link 212. The second case portion 204 includes the core turbomachinery components (e.g., the HP compressor 114 of FIG. 1, the combustion section 116 of FIG. 1, and the HP turbine 118, etc.). As used herein, the portion(s) of the gas turbine engine 200 including one or more of the HP compressor, the combustor section, and the HP turbine are referred to interchangeably as the "carcass" and the "core structure" of the gas turbine engine 200. The carcass of the gas turbine engine 200 is disposed between the mounts 208, 210 and is subject to backbone bending caused by the reaction of the forces (e.g., the engine weight, the inlet load 222, the thrust load 228, etc.) at the mounts 208, 210. The third case portion 206 is the portion of the gas turbine engine 200 that includes the low-pressure turbine (e.g., the LP turbine 120 of FIG. 1, etc.). In the illustrated example of FIG. 2, the third case portion 206 is coupled to the pylon 201 via the aft mount 210.

The forward mount 208, the aft mount 210, and the thrust link 212 couple the gas turbine engine to the pylon 201. The pylon 201 is a mechanical structure that couples the gas turbine engine to an aircraft (e.g., via a wing of the aircraft, an empennage of the aircraft, a fuselage of the aircraft, etc.). The forces and moments generated by the weight and operation of the gas turbine engine 200 are reacted via the mounts 208, 210, and the thrust link 212. The mounts 208, 210, and the thrust link 212 fully constrain the movement of the gas turbine engine 200. That is, each of the six degrees of freedom (e.g., yaw rotation, pitch rotation, roll rotation, yaw translation, pitch translation, and pitch translation, etc.) of the gas turbine engine 200 are reacted via the mounts 208, 210, and the thrust link 212. Bending moments 224, 230 generated during the operation of the gas turbine engine 200 are reacted between the mounts 208, 210 via an imbalance of reaction forces at the mounts 208, 210. As such, the bending moments 224, 230 can cause components between the mounts 208, 210 to distort (e.g., strain, bend, flex, twist, etc.). As such, the flow path components of the gas turbine engine 200, including the HP compressor and the LP compressor, are distorted by the bending moments 224, 230 reacted between the mounts 208, 210. This distortion can reduce blade tip clearance and/or engine performance, for example.

In FIG. 2, the gas turbine engine 200 is subject to a load condition 215, which includes an inlet load 222, which causes a first bending moment 224 with a corresponding first moment arm 226. The load condition 215 also includes a thrust load 228, which causes a second bending moment 230 with a corresponding second moment arm 232. The load condition 215 can be associated with a high-stress operation of the gas turbine engine 200, such as takeoff. In some examples, the load condition 215 occurs during the minimum clearance condition of the gas turbine engine 200. In FIG. 2, the bending moments 224, 230 are calculated with respect to the intersection point 220. In FIG. 2, the calculation of bending moments 224, 230 at the intersection point 220 reduces the computational complexity of the force and moment calculations associated with the mount configuration of the gas turbine engine 200. Particularly, the intersection point 220 lies on the line of action 216, 218 and, as such, the forces associated with the forward mount 208 and the thrust link 212 do not apply a bending moment at the intersection point 220.

The inlet load 222 is an aerodynamic load (e.g., a load caused by asymmetrical pressure on a surface of the gas turbine engine, etc.) experienced by the gas turbine engine 200. The inlet load 222 is caused by the air entering into the inlet 233. Particularly, during the load condition 215, the angle of attack (a) of the gas turbine engine 200 causes the entering air the inlet 233 to incur (e.g., abrade against, etc.) with a top surface of the inlet 233, which increases the pressure experienced at the top of the inlet 233 and decreases the pressure experienced at the bottom of the inlet 233. The pressure differential applied to the inlet 233 results in the inlet load 222 and the first bending moment 224. In FIG. 2 and the examples of FIGS. 3-5, the inlet load 222 is depicted as a load applied on the inlet 233. It should be appreciated that the inlet load 222 is a force equivalent of a pressure applied to the interior of the inlet of the gas turbine engines described herein.

The thrust load 228 is an operational load experienced by the gas turbine engine 200. During operation, the gas turbine engine 200 produces thrust, which propels the gas turbine engine 200. The thrust produced by the gas turbine engine 200 is transferred to the pylon 201 via one or more of the mounts 208, 210, and thrust link 212, which propels the gas turbine engine 200 forward along the roll axis. In FIG. 2, the thrust load 228 acts along a centerline 229 of the gas turbine engine 200.

In FIG. 2, the inlet load 222 and the thrust load 228 cause a first reaction force 221 at the forward mount 208. In FIG. 2, the inlet load 222 and the resulting first bending moment 224 cause a corresponding second reaction force 234 (e.g., an inlet load reaction force, etc.) at the aft mount 210. The second reaction force 234 can, via the principles of statics and summation of moment(s) about the intersection point 220, be expressed as:

$$R_{aft,inlet\ load}=F_{inlet}a/b \quad (1),$$

where $R_{aft,inlet\ load}$ is the second reaction force 234, $F_{inlet}$ is the inlet load 222, a is the first moment arm 226, and b is a distance 235 between the intersection point 220 and the aft mount 210. In FIG. 2, the thrust load 228 and the resulting second bending moment 230 cause a corresponding third reaction force 236 at the aft mount 210. The third reaction force 236 can, via the principles of statics and calculating the bending moment about the intersection point 220, be expressed as:

$$R_{aft,thrust\ load}=F_{thrust}c/b \quad (2),$$

where $R_{aft,thrust\ load}$ is the third reaction force 236, $F_{thrust}$ is the thrust load 228, c is the second moment arm 232, and b is a distance 235 between the intersection point 220 and the aft mount 210. In FIG. 2, the second reaction force 234 and the third reaction force 236 are both exerted in the same direction. As described above, backbone bending in the second case portion 204 is caused by a mismatch in reaction force between the forward mount 208 and the aft mount 210. In FIG. 2, due to the orientation of the thrust link 212 and the strut 209, the reaction forces 234, 236 act in the same upward direction.

The bending moments 224, 230 and resulting opposing forces at the forward mount 208 and the aft mount 210 (e.g., the difference between the first reaction force 221 and the sum of the second reaction force 234 and the third reaction force 236, etc.) cause some or all of the case portions 202, 204, 206 to bend (e.g., distort, twist, flex, etc.) between the forward mount 208 and the aft mount 210. Such bending can decrease the blade tip clearances of compressor blades (e.g., blades similar to HP compressor rotor blades 156, blades similar to the LP compressor rotor blades 152, etc.) within the second case portion 204 (e.g., in particular circumferential sections of the second case portion 204, etc.). Such distortions require the gas turbine engine 200 to be designed to prevent incursions of the compressor blades and the radially adjacent casing portion(s) by increasing the clearance of the blade tips while the engine is not operating (e.g., cold, etc.).

In FIG. 2, the first bending moment 224, caused by the inlet load 222, and the second bending moment 230, caused by the thrust load 228, act in the same direction (e.g., in the negative pitch-wise direction, clockwise, etc.). Because the bending moments 224, 230 act in the same direction, the associated reaction forces 234, 236, respectively, at the aft mount 210 are also in the same direction (e.g., the positive yaw direction in FIG. 2, etc.). As such, the distortion(s) (e.g., the strain, the bending, the twisting, etc.) caused by the inlet load 222 and the thrust load 228 are additive, which causes increases in either the inlet load 222 or the thrust load 228 to increase the bending of the second case portion 204.

The following examples refer to a gas turbine engine, similar to the gas turbine engine 200 described with reference to FIGS. 2, except that the engine is modified to reduce the bending moment experienced by the casing. When the same element number is used in connection with FIGS. 3-5 as was used in FIG. 1, it has the same meaning unless indicated otherwise.

Figure 3:
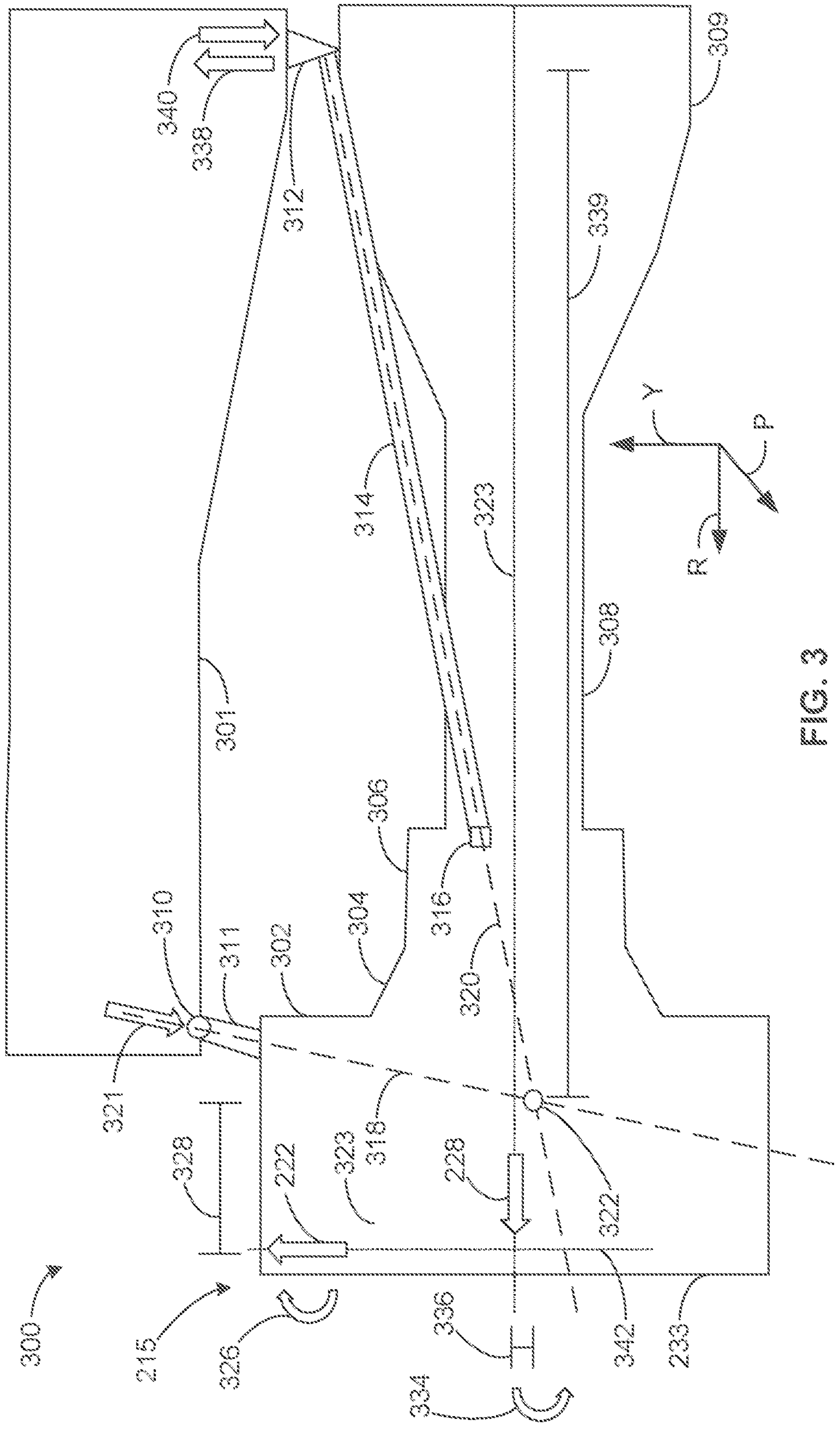
FIG. 3 is a schematic view of a mounting configuration implemented in accordance with the teachings of this disclosure.

FIG. 3 is a side schematic view of an example gas turbine engine 300 coupled to a pylon 301 implemented in accordance with the teachings of this disclosure. In the illustrated example of FIG. 3, the gas turbine engine 300 includes an example first case portion 302, an example second case portion 304, an example third case portion 306, and an example fourth case portion 308. In some examples, the gas turbine engine 300 can include additional case portions (not illustrated) between respective ones of the case portions 302, 304, 306, 308, and/or downstream of the fourth case portion 308.

In the illustrated example of FIG. 3, the gas turbine engine 300 includes an example forward mount 310, an example strut 311, an example aft mount 312, and an example thrust link 314. In the illustrated example of FIG. 3, the thrust link 314 extends between the aft mount 312 and an example mount location 316 on the example second case portion 304. In the illustrated example of FIG. 3, the strut 311 and/or forward mount 310 define an example first line of action 318, and the thrust link 314 defines an example second line of action 320. In the illustrated example of FIG. 3, the first line of action 318 and the second line of action 320 have an example intersection point 322.

The forward mount 310, the aft mount 312, and the thrust link 314 couple the gas turbine engine 300 to the pylon 301. The pylon 301 is a mechanical structure that couples the gas turbine engine 300 to an aircraft (e.g., via a lower surface of the wing of the aircraft, etc.). In some examples, the pylon 301 can be absent. In some such examples, the gas turbine engine 300 can be coupled to another suitable location on the aircraft and/or another vehicle. For example, the gas turbine engine 300 can be coupled to a tail of an aircraft, to a fuselage of an aircraft, and/or above the wing of an aircraft.

In the illustrated example of FIG. 3, the first case portion 302 includes the portion of the case of the gas turbine engine 200 that houses the turbomachinery components of the fan (e.g., the fan section 106 of FIG. 1, etc.) and the fan frame. In the illustrated example of FIG. 3, the first case portion 302 is coupled to the pylon 301 via the forward mount 310. The second case portion 304 includes a portion of the gas turbine engine 300 that houses some or all of the turbomachinery components of the booster (e.g., the LP compressor 112 of FIG. 1, etc.). In some examples, the second case portion 304 is a booster case portion. The third case portion 306 is disposed between the second case portion 304 and the fourth case portion 308. In some examples, the third case portion 306 is an intermediate case portion. In the illustrated example of FIG. 3, the mount location 316 of the thrust link 314 is disposed on the third case portion 306. The fourth case portion 308 includes the core turbomachinery components of the gas turbine engine 300 (e.g., the HP compressor 114 of FIG. 1, the combustion section 116 of FIG. 1, and the HP turbine 118, etc.). Unlike the gas turbine engine 200 of FIG. 2, the gas turbine engine 300 includes the second case portion 304 and the third case portion 306 disposed between the fan case portion (e.g., the first case portion 302, etc.) and the case portion that houses the HP compressor, the combustor, and the HP turbine. In the illustrated example of FIG. 3, the presence of the second case portion 304 and the third case portion 306 increases the distance between the forward mount 310 and the mount location 316 and causes the intersection point 322 to be beneath (e.g., closer to the ground, on an opposite side of the centerline 323 as the pylon 301, etc.) an example centerline 323 of the gas turbine engine 300 and axially downstream of the inlet load axis 342, unlike the intersection point 220 of the gas turbine engine 200 of FIG. 2.

In the illustrated example of FIG. 3, the second case portion 304, the third case portion 306, and the fourth case portion 308 form the carcass of the gas turbine engine 300. In the illustrated example of FIG. 3, the carcass of the gas turbine engine 300 is disposed between the mounts 310, 312 and is subjected to backbone bending caused by the reaction of the forces (e.g., the engine weight, the inlet load 222, the thrust load 228, etc.) at the mounts 310, 312. The fifth case portion 309 is the portion of the gas turbine engine 300 that includes the low-pressure turbine (e.g., the LP turbine 120 of FIG. 1, etc.). In the illustrated example of FIG. 3, the fifth case portion 309 is coupled to the pylon 301 via the aft mount 312.

In the illustrated example of FIG. 3, the forward mount 310, the aft mount 312, and the thrust link 314 couple the gas turbine engine 300 to the pylon 301. The pylon 301 is a mechanical structure that couples the gas turbine engine 300 to an aircraft (e.g., via a wing of the aircraft, etc.). The forces and moments generated by the weight and operation of the gas turbine engine 300 are reacted via the mounts 310, 312, and thrust link 314. The mounts 310, 312 and the thrust link 314 fully constrain the movement of the gas turbine engine 300. That is, each of the six degrees of freedom (e.g., yaw rotation, pitch rotation, roll rotation, yaw translation, pitch translation, and pitch translation, etc.) of the gas turbine engine 300 are reacted via the mounts 310, 312, and thrust link 314. Bending moments (e.g., the bending moments 326, 334 etc.) generated during the operation of the gas turbine engine 300 are reacted between the mounts 310, 312 via an imbalance of loads at the mounts 310, 312. As such, these bending moments (e.g., the bending moments 326, 334, etc.) can cause components between the mounts 310, 312 to distort (e.g., strain, bend, flex, twist, etc.). As such, the flow path components of the gas turbine engine 300, including the HP compressor and the LP compressor, are distorted by the bending moments (e.g., the bending moments 326, 334, etc.) reacted between the mounts 310, 312. This distortion can reduce blade tip clearance and/or engine performance.

In the illustrated example of FIG. 3, the forward mount 310 is a structural linkage that couples the first case portion 302 to the pylon 301. In the illustrated example of FIG. 3, the strut 311 extends between the first case portion 302 and the forward mount 310. In some examples, the strut 311 can be implemented by a structural outlet guide vane (OGV). In other examples, the strut 311 can be implemented by a non-aerodynamic structural member. In some examples, the strut 311 can be absent. In some such examples, the forward mount 310 can directly couple the first case portion 302 and the pylon 301. In some examples, the forward mount 310 can be implemented by one or more 2-pin swing linkage, one or more 3-pin fixed linkage (e.g., a boomerang linkage, a triangle linkage, a straight linkage with a center pin, etc.), one or more pivot linkages, one or more ball linkages, etc. The aft mount 312 is a structural linkage that couples the fifth case portion 309. In some examples, the aft mount 312 can be implemented by a 2-pin swing linkage and/or a 3-pin fixed linkage with any of various shapes (e.g., a boomerang linkage, a triangle linkage, a straight linkage with a center pin, etc.). The thrust link 314 is a structural member that extends between the mount location 316 and the aft mount 312. In some examples, the thrust link 314 can transmit axial loads between the front and aft of the gas turbine engine 300. Additionally or alternatively, in some configurations, the thrust link 212 can similarly react applied axial loads and/or yaw moments.

In the illustrated example of FIG. 3, the gas turbine engine 300 is subject to the load condition 215 of FIG. 2, which includes the inlet load 222 and the thrust load 228. In the illustrated example of FIG. 3, the inlet load 222 acts along an example inlet load axis 342 and causes an example first bending moment 326 with a corresponding example first moment arm 328. In the illustrated example of FIG. 3 the thrust load 228 acts along an example centerline 323 causes an example second bending moment 334 with a corresponding example second moment arm 336. The second moment arm 336 is the displacement of the intersection point 322 from the centerline 323 along the yaw axis. As described above, the load condition 215 can be associated with a high-stress operation of the gas turbine engine 200, such as takeoff/liftoff. In other examples, the gas turbine engine 300 can be subject to any suitable load conditions. In the illustrated example of FIG. 3, the bending moments 326, 334 are calculated with respect to the intersection point 322. The calculation of bending moments 326, 334 at the intersection point 322 reduces the computational complexity of the force and moment calculations associated with the mount configuration of the gas turbine engine 300. Particularly, the intersection point 322 lies on the line of action 318, 320, and, as such, the forces associated with the forward mount 310 and the thrust link 314 do not apply a bending moment at the intersection point 322.

In the illustrated example of FIG. 3, the inlet load 222 and the thrust load 228 cause an example first reaction force 321 at the forward mount 310. In the illustrated example of FIG. 3, the inlet load 222 and the resulting first bending moment 326 cause a corresponding second reaction force 338 (e.g., an inlet load reaction force, etc.) at the aft mount 312. The second reaction force 338 can, via the principles of statics and summation of moment(s) about the intersection point 322, be expressed as:

$$R_{aft,inlet\ load} = F_{inlet}\frac{c}{d}, \tag{3}$$

where $R_{aft,inlet\ load}$ is the second reaction force 338, $F_{inlet}$ is the inlet load 222, c is the first moment arm 328, and d is an example distance 339 between the intersection point 322 and the aft mount 312. In the illustrated example of FIG. 3, the thrust load 228 and the resulting second bending moment 334 cause a corresponding third reaction force 340 at the aft mount 312. The third reaction force 340 can, via the principles of statics and calculating the bending moment about the intersection point 322, be expressed as:

$$R_{aft,thrust\ load} = F_{thrust}\frac{e}{d}, \tag{4}$$

where $R_{aft,thrust\ load}$ is the third reaction force 340, $F_{thrust}$ is the thrust load 228, e is the second moment arm 336, and d is the distance 339. In the illustrated example of FIG. 3, the second reaction force 338 and the third reaction force 340 are exerted in opposing directions. As described above, backbone bending in the gas turbine engine 300 is caused by a mismatch in reaction force between the forward mount 310 and the aft mount 312. In the illustrated example of FIG. 3, due to the orientation of the thrust link 314 and the strut 311, the reaction forces 338, 340 act in opposing directions. Particularly, because the intersection point 322 is beneath the centerline 323 and axially downstream as the inlet load axis 342, the second moment arm 336 extends downward, which causes the second bending moment 334 and associated third reaction force 340 to act in the opposite direction as the first bending moment 326 and the associated second reaction force 338, respectively.

In the illustrated example of FIG. 3, the first bending moment 326, caused by the inlet load 222, and the second bending moment 334, caused by the thrust load 228, act in opposite directions (e.g., the first bending moment 326 acts in the negative pitch direction, the second bending moment 334 acts in the positive pitch direction, etc.). Because the bending moments 326, 334 act in opposing directions, the associated reaction forces 338, 340, respectively, at the aft mount 312 are also in opposing directions. Accordingly, unlike the gas turbine engine 200 of FIG. 2, the first bending moment 326 and the second bending moment 334 are subtractive and reduce the overall magnitude of the force applied to the aft mount 312. In some examples, the bending moments 326, 334 and/or the reaction forces 338, 340 can cancel out (e.g., partly cancel out, fully cancel out, etc.), which reduces the resulting load on the aft mount 312 and resulting carcass distortion(s), when compared to net bending moment on the gas turbine engine 200 of FIG. 2. The reduced net bending moment on the gas turbine engine 300 reduces the distortions (e.g., the strains, the deflections, the bending, etc.) experienced by the gas turbine engine 300, which reduces the required cold blade tip clearances of the gas turbine engine 300 in comparison to the gas turbine engine 200 of FIG. 2. The tighter operational tip clearances increase engine efficiency and engine operability, and decrease fuel consumption (e.g., reduce specific fuel consumption (SFC), etc.).

Figure 4:
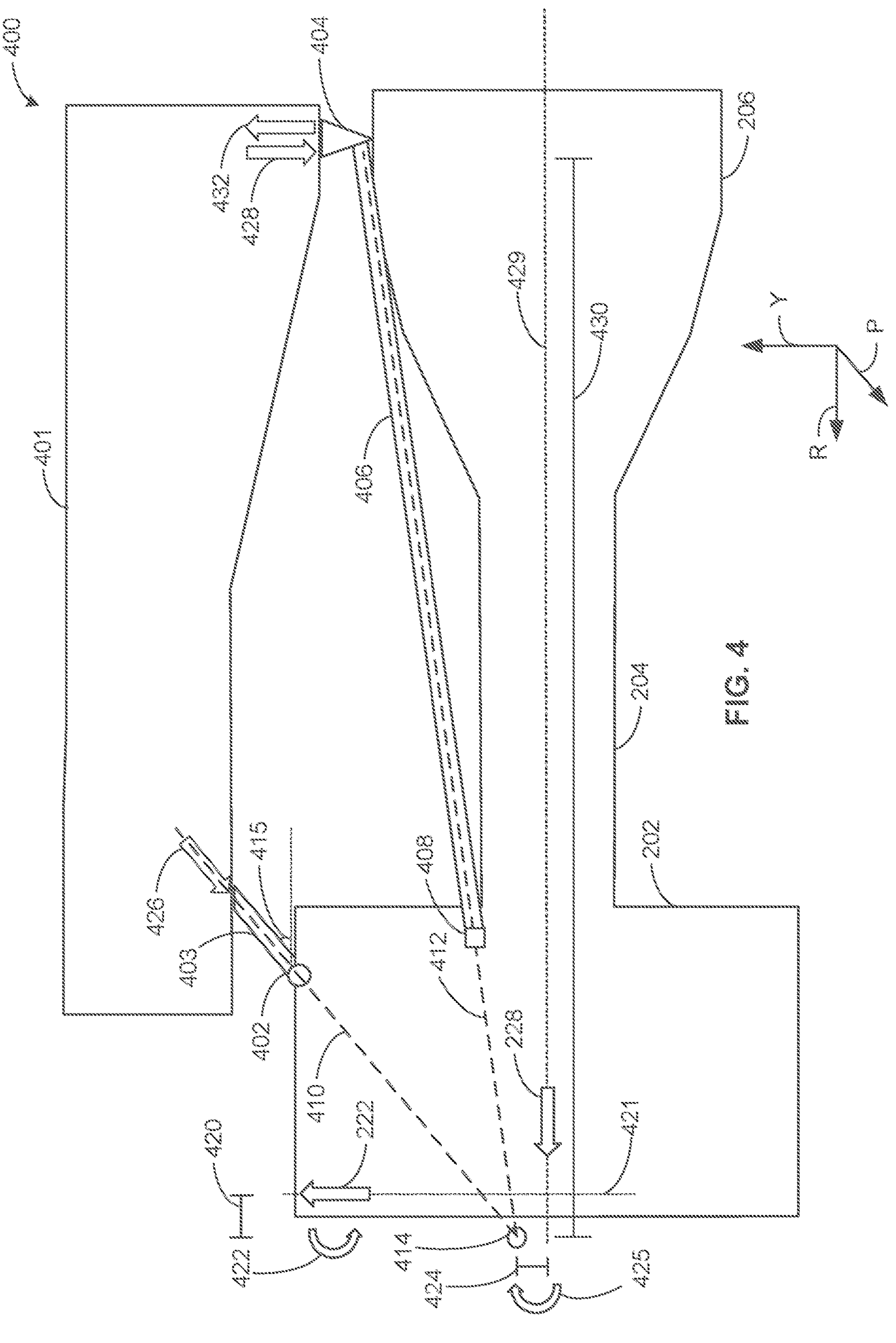
FIG. 4 is a cross-sectional view of a second mounting configuration implemented in accordance with the teachings of this disclosure.

FIG. 4 is a side schematic view of an example gas turbine engine 400 coupled to a pylon 401 implemented in accordance with the teachings of this disclosure. In the illustrated example of FIG. 4, the gas turbine engine 400 includes the first case portion 202 of FIG. 2, the second case portion 204 of FIG. 2, and the third case portion 206 of FIG. 2. While the gas turbine engine 400 of FIG. 4 is described as having the same arrangement of case portions as the gas turbine engine 200 of FIG. 2, in other examples, the gas turbine engine 400 can have any other suitable arrangement of case portions, including the arrangement of case portions of the gas turbine engine 300 of FIG. 3 (e.g., including a booster case portion, similar to the second case portion 304 of FIG. 3, and an intermediate case portion, similar to the third case portion 306 of FIG. 3, etc.). Additionally or alternatively, the gas turbine engine 400 can include additional case portions (not illustrated) between ones of the case portions 202, 204, 206, and/or downstream of the third case portion 206.

In the illustrated example of FIG. 4, the gas turbine engine 400 includes an example forward mount 402, an example strut 403, an example aft mount 404, and an example thrust link 406. In the illustrated example of FIG. 4, the thrust link 406 extends between the aft mount 404 and an example mount location 408 on the first case portion 202. In the illustrated example of FIG. 4, the strut 403 and/or forward mount 402 define an example first line of action 410 and the thrust link 406 defines an example second line of action 412. In the illustrated example of FIG. 4, the first line of action 410 and the second line of action 412 have an example intersection point 414.

In the illustrated example of FIG. 4, the forward mount 402 is a structural linkage that couples the first case portion 202 to the pylon 401. In the illustrated example of FIG. 4, the strut 403 extends between the first case portion 202 and the forward mount 402. In some examples, the strut 403 can be implemented by a structural outlet guide vane (OGV). In other examples, the strut 403 can be implemented by a non-aerodynamic structural member. In some examples, the strut 403 can be absent. In some such examples, the forward mount 402 can directly couple the first case portion 202 and the pylon 401. In the illustrated example of FIG. 4, the strut 403 forms an acute angle 415 with the roll axis. In the illustrated example of FIG. 4, the acute angle 415 is approximately 40 degrees. In other examples, the acute angle 415 can have any other suitable value (e.g., between 70 degrees and 20 degrees, etc.). In some examples, the forward mount 402 can be implemented by one or more 2-pin swing linkage, one or more 3-pin fixed linkages (e.g., a boomerang linkage, a triangle linkage, a straight linkage with a center pin, etc.), one or more pivot linkages, one or more ball linkages, etc.

In the illustrated example of FIG. 4, the aft mount 404 is a structural linkage that couples the third case portion 206. In some examples, the aft mount 404 can be implemented by a 2-pin swing linkage and/or a 3-pin fixed linkage with any of various shapes (e.g., a boomerang linkage, a triangle linkage, a straight linkage with a center pin, etc.). The thrust link 406 is a structural member that extends between the mount location 408 and the aft mount 404. The thrust link 406 transmits axial loads between the front and aft of the gas turbine engine 400. Additionally or alternatively, in some configurations the thrust link 406 can similarly react axial loads and/or yaw moments.

The forces and moments generated by the weight and operation of the gas turbine engine 400 are reacted via the mounts 402, 404, and thrust link 406. In the illustrated example of FIG. 4, the mounts 402, 404 and the thrust link 406 fully constrain the movement of the gas turbine engine 400. For example, each of the six degrees of freedom (e.g., yaw-rotation, pitch rotation, roll rotation, yaw-translation, pitch translation, and pitch translation, etc.) of the gas turbine engine 400 are reacted via the mounts 402, 404, and thrust link 406. Bending moments generated during the operation of the gas turbine engine 400 are reacted between the mounts 402, 404 via an imbalance of loads at the mounts 402, 404.

In the illustrated example of FIG. 4, the gas turbine engine 400 is subject to the load condition 215 of FIG. 2, which includes the thrust load 228 and the inlet load 222. In the illustrated example of FIG. 4, the inlet load 222 acts along an example inlet load axis 421 and causes an example first bending moment 422 with an example corresponding first moment arm 420. In the illustrated example of FIG. 4, the thrust load 228 acts along an example centerline 429 and causes an example second bending moment 425 with a corresponding second moment arm 424. The second moment arm 424 is the displacement of the intersection point 414 from the centerline 429 of the gas turbine engine along the yaw axis. In the illustrated example of FIG. 4, the bending moments 422, 425 are calculated with respect to the intersection point 414. The calculation of bending moments at the intersection point 414 reduces the computational complexity of the force and moment calculations associated with the mount configuration of the gas turbine engine 400. Particularly, the intersection point 414 lies on the line of actions 410, 412, respectively, and, as such, the forces associated with the forward mount 402 and the thrust link 406 do not apply a bending moment at the intersection point 414.

In the illustrated example of FIG. 4, the inlet load 222 and the thrust load 228 cause an example first reaction force 426 at the forward mount 402. In the illustrated example of FIG. 4, the inlet load 222 and the resulting bending moment 422 cause an example second reaction force 428 (e.g., an inlet load reaction force, etc.) at the aft mount 210. The second reaction force 428 can, via the principles of statics and summation of moment(s) about the intersection point 414, be expressed as:

$$R_{aft,inlet\ load} = F_{inlet}\frac{f}{g}, \tag{3}$$

where $R_{aft,inlet\ load}$ is the second reaction force 428, $F_{inlet}$ is the inlet load 222, f is the first moment arm 420, and d is an example distance 430 between the intersection point 414 and the aft mount 404. In the illustrated example of FIG. 4, the thrust load 228 and the resulting second bending moment 425 cause an example third reaction force 432 at the aft mount 404. The third reaction force 432 can, via the principles of statics and calculating the bending moment about the intersection point 414, be expressed as:

$$R_{aft,thrust\ load} = F_{thrust}\frac{h}{g}, \tag{4}$$

where $R_{aft,thrust\ load}$ is the third reaction force 432, $F_{thrust}$ is the thrust load 228, h is the second moment arm 424, and d is the distance 430. In the illustrated example of FIG. 4, the second reaction force 428, and the third reaction force 432 are exerted in opposing directions. As described above, backbone bending in the gas turbine engine 400 is caused by a bending moment transmitted through the second case portion 204 associated with a mismatch in reaction force between the forward mount 402 and the aft mount 404. In the illustrated example of FIG. 4, due to the orientation of the thrust link 406 and the strut 403, the reaction forces 428, 432 act in opposing directions. Particularly, because the intersection point 414 is in front (e.g., forward on the roll axis, axially upstream etc.) of the inlet load axis 421 and above the centerline 429, the first moment arm 420 extends forward, which causes the first bending moment 422 and associated second reaction force 428 to act in the opposite direction as the second bending moment 425 and the associated third reaction force 432, respectively. In the illustrated example of FIG. 4, the intersection point 414 is outside of the gas turbine engine 400.

In the illustrated example of FIG. 4, the first bending moment 422, caused by the inlet load 222, and the second bending moment 425, caused by the thrust load 228, act in opposite directions. Similar to the gas turbine engine 300 of FIG. 3, the opposing bending moments 422, 425 cause the associated reaction forces 428, 432 to also be in opposing directions. Accordingly, unlike the gas turbine engine 200 of FIG. 2, the first bending moment 422 and the second bending moment 425 are subtractive and reduce the overall magnitude of the force applied to the aft mount 404. In some examples, the bending moments 422, 425 and/or the reaction forces 428, 432 can cancel out (e.g., partly cancel out, fully cancel out, sum to substantially zero, etc.), which reduces the resulting load on the aft mount 404 and resulting carcass distortion(s), when compared to a net bending moment on the gas turbine engine 400. The reduced net bending moment on the gas turbine engine 400 reduces the distortions (e.g., the strains, the deflections, the bending, etc.) experienced by the gas turbine engine 400, which reduces the required cold blade tip clearances of the gas turbine engine 400 in comparison to the gas turbine engine 200 of FIG. 2. The tighter operational tip clearances increase engine efficiency and engine operability, and decrease fuel consumption (e.g., reduce specific fuel consumption (SFC), etc.).

Figure 5:
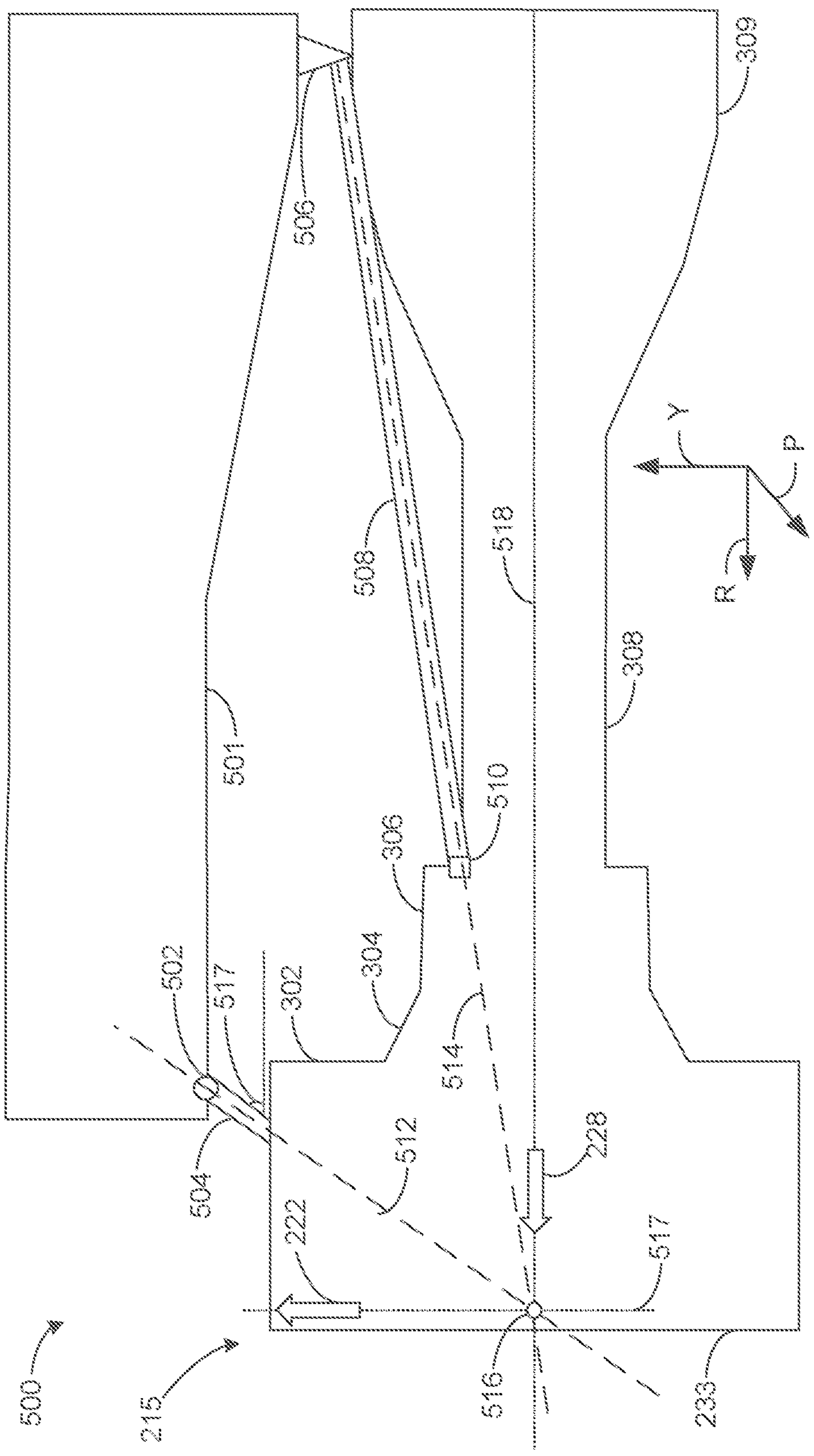
FIG. 5 is a cross-sectional view of a third mounting configuration implemented in accordance with the teachings of this disclosure.

FIG. 5 is a side schematic view of an example gas turbine engine 500 coupled to a pylon 501 implemented in accordance with the teachings of this disclosure. In the illustrated example of FIG. 5, the gas turbine engine 500 includes the first case portion 302 of FIG. 3, the second case portion 304 of FIG. 3, the third case portion 306 of FIG. 3, the fourth case portion 308 of FIG. 3, and the fifth case portion 309 of FIG. 3. While the gas turbine engine 500 of FIG. 5 is described as having the same arrangement of case portions as the gas turbine engine 300 of FIG. 3, in other examples, the gas turbine engine 500 can have any other suitable arrangement of case portions, including the arrangement of case portions of the gas turbine engine 200 of FIG. 2 (e.g., not including the second case portion 304 and/or the third case portion 306, etc.). Additionally or alternatively, the gas turbine engine 500 can include additional case portions (not illustrated) between ones of the case portions 302, 304, 306, 308, 309, and/or downstream of the fifth case portion 309.

In the illustrated example of FIG. 5, the gas turbine engine 500 includes an example forward mount 502, an example strut 504, an example aft mount 506, and an example thrust link 508. In the illustrated example of FIG. 5, the thrust link 508 extends between the aft mount 506 and an example mount location 510 on the third case portion 306. In the illustrated example of FIG. 5, the strut 504 and/or forward mount 502 define an example first line of action 512 and the thrust link 508 defines an example second line of action 514. In the illustrated example of FIG. 5, the first line of action 512 and the second line of action 514 have an example intersection point 516.

In the illustrated example of FIG. 5, the forward mount 502 is a structural linkage that couples the first case portion 302 to the pylon 501. In the illustrated example of FIG. 5, the strut 504 extends between the first case portion 302 and the forward mount 502. In some examples, the strut 504 can be implemented by an OGV. In other examples, the strut 504 can be implemented by a non-aerodynamic structural member. In some examples, the strut 504 can be absent. In some such examples, the forward mount 502 can directly couple the first case portion 302 and the pylon 501. In the illustrated example of FIG. 5, the strut 504 forms an acute angle 517 with the roll axis. In the illustrated example of FIG. 5, the acute angle 517 is approximately 60 degrees. In other examples, the acute angle 517 can have any other suitable value (e.g., between 70 degrees and 20 degrees, etc.). In some examples, the forward mount 502 can be implemented by one or more 2-pin swing linkages, one or more 3-pin fixed linkages (e.g., a boomerang linkage, a triangle linkage, a straight linkage with a center pin, etc.), one or more pivot linkages, one or more ball linkages, etc.

In the illustrated example of FIG. 5, the aft mount 506 is a structural linkage that couples the fifth case portion 309. In some examples, the aft mount 506 can be implemented by a 2-pin swing linkage and/or a 3-pin fixed linkage with any of various shapes (e.g., a boomerang linkage, a triangle linkage, a straight linkage with a center pin, etc.). The thrust link 508 is a structural member that extends between the mount location 510 and the aft mount 506. The thrust link 508 transmits axial loads between the front and aft of the gas turbine engine 500. Additionally or alternatively, in some configurations, the thrust link 508 can similarly react axial loads and/or yaw moments.

The forces and moments generated by the weight and operation of the gas turbine engine 500 are reacted via the mounts 502, 506, and thrust link 508. In the illustrated example of FIG. 5, the mounts 502, 506 and the thrust link 508 fully constrain the movement of the gas turbine engine 500. For example, each of the six degrees of freedom (e.g., yaw-rotation, pitch rotation, roll rotation, yaw-translation, pitch translation, and pitch translation, etc.) of the gas turbine engine 500 are reacted via the mounts 502, 506, and thrust link 508. Bending moments generated during the operation of the gas turbine engine 500 via an imbalance of loads at the mounts 502, 506.

In the illustrated example of FIG. 5, the gas turbine engine 500 is subject to the load condition 215 of FIG. 2, which includes the thrust load 228 and the inlet load 222. In the illustrated example of FIG. 5, the inlet load 222 acts along an example inlet load axis 517 and the thrust load 228 acts along an example centerline 518. In the illustrated example of FIG. 5, the thrust link 508 and the forward mount 502 are arranged such that the intersection point 516 is disposed on the centerline 518 of the gas turbine engine 500 and the inlet load axis 517. That is, in the illustrated example of FIG. 5, the intersection point 516 is at a same axial location as the inlet load 222 and at a same pitch-wise location as the thrust load 228. Accordingly, in the illustrated example of FIG. 5, the inlet load 222 and the thrust load 228 do not exert a bending moment on the gas turbine engine 500. Accordingly, the total bending moment on the gas turbine engine 500 is reduced (e.g. other loads, including engine weight and other aerodynamic loads, may still exert a bending moment on the gas turbine engine 500, etc.). The reduced net bending moment on the gas turbine engine 500 reduces the distortions (e.g., the strains, the deflections, the bending, etc.) experienced by the gas turbine engine 500, which reduces the required cold blade tip clearances of the gas turbine engine 500 in comparison to the gas turbine engine 200 of FIG. 2. The tighter operational tip clearances increase engine efficiency and engine operability, and decrease fuel consumption (e.g., reduce specific fuel consumption (SFC), etc.).

The gas turbine engine 300 of FIG. 3, the gas turbine engine 400 of FIG. 4, and the gas turbine engine of FIG. 5 are described as being wing-mounted. While examples disclosed herein are described with reference to a gas turbine engine mounted to a wing, the teachings of this disclosure should not be limited exclusively to wing-mounted gas turbine engines. Instead, the gas turbine engine 300, the gas turbine engine 400, and the gas turbine engine 500 can be disposed at another suitable location on an aircraft (e.g., fuselage-mounted, empennage-mounted, tail-mounted, etc.). The gas turbine engine 300, the gas turbine engine 400, and the gas turbine engine 500 shown and described in detail in FIGS. 3-5, respectively, are axial-flow turbofan engines. In other examples, the gas turbine engine 300, the gas turbine engine 400, and/or the gas turbine engine 500 can be another suitable type of gas turbine engine (e.g., a turboprop, a turbojet, a turboshaft, a centrifugal flow engine, etc.). Additionally, while the gas turbine engine 300 of FIG. 3, the gas turbine engine 400 of FIG. 4, and/or the gas turbine engine 500 of FIG. 5 are described and depicted as two-spool engines, in other examples, the gas turbine engine 300, the gas turbine engine 400 of FIG. 4, and/or the gas turbine engine 500 of FIG. 5 can have any suitable number of spools (e.g., one spool, three spools, etc.). In some examples, the gas turbine engine 300 of FIG. 3, the gas turbine engine 400 of FIG. 4, and/or the gas turbine engine 500 of FIG. 5 can include components not depicted in FIGS. 3-5 (e.g., an afterburner, etc.).

From the foregoing, it will be appreciated that example systems, apparatus, and articles of manufacture have been disclosed that increase gas turbine efficiency (e.g., specific fuel consumption, etc.) by enabling a reduction in blade tip clearance in the rotors of the engine. The example mount configurations disclosed herein reduce backbone bending via engine mount configurations that cause the inlet load and the thrust load to be applied in opposite directions, which reduces the net bending moment applied to the engine. Examples disclosed herein reduce the distortions, strain, and/or bending caused by gas turbine operation.

Further aspects of the present disclosure are provided by the subject matter of the following clauses:

Example 1 includes a gas turbine engine defining a centerline, the gas turbine engine comprising a pylon, an inlet to be subjected to an inlet load along an inlet load axis, a case assembly including a first case portion and a second case portion, a forward mount coupling the first case portion to the pylon, the coupling of the forward mount to the pylon defining a first line of action, an aft mount, and a thrust link coupling the second case portion to the pylon, the thrust link defining a second line of action, an intersection of the first line of action and the second line of action disposed at least one (1) on the inlet load axis and the centerline, (2) downstream of the inlet load axis and beneath the centerline, or (3) upstream of the inlet load axis and above the centerline.

Example 2 includes the gas turbine engine of any preceding clause, wherein the case assembly includes a booster case, the first case portion is a fan case, and the second case portion is an intermediate case disposed downstream of the fan case and the booster case.

Example 3 includes the gas turbine engine of any preceding clause, wherein a first end of the forward mount is coupled to the fan case and a second end of the forward mount is coupled to the pylon.

Example 4 includes the gas turbine engine of any preceding clause, wherein a first end of the thrust link is coupled to the intermediate case, and a second end of the thrust link is disposed adjacent to the aft mount.

Example 5 includes the gas turbine engine of any preceding clause, wherein the thrust link is configured to be subjected to a thrust load during a condition of the gas turbine engine, the intersection has a displacement from the centerline, the displacement defines a moment arm of a first moment associated the thrust load, and the first moment in an opposite rotational direction to a second moment associated with the inlet load.

Example 6 includes the gas turbine engine of any preceding clause, wherein the condition is a takeoff condition.

Example 7 includes the gas turbine engine of any preceding clause, wherein the first moment is to cause a first reaction force at the aft mount, the second moment is to cause a second reaction force at the aft mount, the first reaction force in an opposite direction as the second reaction force.

Example 8 includes the gas turbine engine of any preceding clause, wherein the forward mount includes an outlet guide vane.

Example 9 includes the gas turbine engine of any preceding clause, wherein the outlet guide vane forms an acute angle with the centerline.

Example 10 includes the gas turbine engine of any preceding clause, wherein the intersection is outside of the gas turbine engine.

Example 11 includes an apparatus to couple a gas turbine engine to a pylon, the gas turbine engine having a centerline, the gas turbine engine to be subjected to an inlet load along an inlet load axis, the apparatus comprising a forward mount to couple a first portion of the gas turbine engine to the pylon along a first line of action, an aft mount, and a thrust link configured to couple a second portion of the gas turbine engine to the pylon, the thrust link defining a second line of action, an intersection of the first line of action and the second line of action disposed at least one (1) on the inlet load axis and the centerline, (2) downstream of the inlet load axis and beneath the centerline, or (3) upstream of the inlet load axis and above the centerline.

Example 12 includes the apparatus of any preceding clause, wherein the first portion is a fan case, and the second portion is an intermediate case disposed downstream of the fan case and a booster case of the gas turbine engine.

Example 13 includes the apparatus of any preceding clause, wherein a first end of the forward mount is coupled to the fan case and a second end of the forward mount is coupled to the pylon.

Example 14 includes the apparatus of any preceding clause, wherein a first end of the thrust link is coupled to the intermediate case, and a second end of the thrust link is disposed adjacent to the aft mount.

Example 15 includes the apparatus of any preceding clause, wherein the thrust link is configured to be subjected to a thrust load during a condition of the gas turbine engine, the intersection has a displacement from the centerline, the displacement defines a moment arm of a first moment associated the thrust load, and the first moment in an opposite rotational direction to a second moment associated with the inlet load.

Example 16 includes the apparatus of any preceding clause, wherein the condition is a takeoff condition.

Example 17 includes the apparatus of any preceding clause, wherein the first moment is to cause a first reaction force at the aft mount, the second moment is to cause a second reaction force at the aft mount, the first reaction force in an opposite direction as the second reaction force.

Example 18 includes the apparatus of any preceding clause, wherein the forward mount includes an outlet guide vane.

Example 19 includes the apparatus of any preceding clause, wherein the outlet guide vane forms an acute angle with the centerline.

Example 20 includes the apparatus of any preceding clause, wherein the intersection point is outside of the gas turbine engine.

Example 21 includes a gas turbine engine having a centerline, the gas turbine engine comprising a pylon, a case assembly including a first case portion and a second case portion, and a forward mount coupling the first case portion to the pylon, the coupling of the forward mount to the pylon defining a first line of action, an aft mount, and a thrust link coupling the second case portion to the pylon, the thrust link defining a second line of action with the aft mount, an intersection of the first line of action and the second line of action on an opposite side of the centerline as the pylon.

Example 22 includes the gas turbine engine of any preceding clause, wherein the case assembly includes a booster case, the first case portion is a fan case, and the second case portion is an intermediate case disposed downstream of the fan case and the booster case.

Example 23 includes the gas turbine engine of any preceding clause, wherein a first end of the forward mount is coupled to the fan case and a second end of the forward mount is coupled to the pylon.

Example 24 includes the gas turbine engine of any preceding clause, wherein a first end of the thrust link is coupled to the intermediate case, and a second end of the thrust link is disposed adjacent to the aft mount.

Example 25 includes the gas turbine engine of any preceding clause, wherein the thrust link is configured to be subjected to a thrust load during a condition of the gas turbine engine, the intersection has a displacement from the centerline, the displacement defines a moment arm of a first moment associated the thrust load, and the first moment in an opposite direction to a second moment associated with a second load.

Example 26 includes the gas turbine engine of any preceding clause, wherein the second load is an inlet load, and further including an inlet configured to be subjected to the inlet load during the condition.

Example 27 includes the gas turbine engine of any preceding clause, wherein the condition is takeoff.

Example 28 includes the gas turbine engine of any preceding clause, wherein the forward mount includes an outlet guide vane.

Example 29 includes a gas turbine engine having a centerline, the gas turbine engine comprising an inlet, a pylon, a case assembly including a first case portion and a second case portion, and a forward mount coupling the first case portion to the pylon, the coupling of the forward mount to the pylon defining a first line of action, an aft mount, and a thrust link coupling the second case portion to the pylon, the thrust link defining a second line of action with the aft mount, an intersection of the first line of action and the second line of action axially forward of the inlet.

Example 30 includes the gas turbine engine of any preceding clause, wherein a first end of the forward mount is coupled to the first case portion and a second end of the forward mount is coupled to the pylon.

Example 31 includes the gas turbine engine of any preceding clause, wherein the thrust link is to be subjected to a thrust load during a condition, the intersection has a displacement from the centerline, the displacement defines a moment arm of a first moment associated with the thrust load, and the first moment in an opposite direction to a second moment associated with a second load.

Example 32 includes the gas turbine engine of any preceding clause, wherein the second load is an inlet load applied to the inlet during the condition.

Example 33 includes the gas turbine engine of any preceding clause, wherein the condition is takeoff.

Example 34 includes the gas turbine engine of any preceding clause, wherein the forward mount includes an outlet guide vane.

Example 35 includes an apparatus to couple a gas turbine engine to a pylon, the apparatus comprising a forward mount to couple a first portion of the gas turbine engine to the pylon along a first line of action, an aft mount, and a thrust link configured to couple a second portion of the gas turbine engine to the pylon, the thrust link defining a second line of action with the aft mount, an intersection of the first line of action and the second line of action disposed to be disposed on a centerline of the gas turbine engine.

Example 36 includes the apparatus of any preceding clause, wherein the gas turbine engine is to be subjected to an inlet load during a flight stage, the inlet load acting at an axial location, the intersection disposed at the axial location.

Example 37 includes the apparatus of any preceding clause, wherein the flight stage is takeoff.

Example 38 includes the apparatus of any preceding clause, wherein the first portion is a fan case and the second portion is an intermediate case disposed downstream of the fan case and a booster case of the gas turbine engine.

Example 39 includes the apparatus of any preceding clause, wherein a first end of the forward mount is coupled to the fan case and a second end of the forward mount is coupled to the pylon.

Example 40 includes the apparatus of any preceding clause, wherein the forward mount includes an outlet guide vane.

Example 41 includes an apparatus to couple a gas turbine engine to a pylon, the apparatus comprising first means for mounting a first portion of the gas turbine engine to the pylon along a first line of action, second means for mounting the gas turbine engine to the pylon, and third means of mounting the gas turbine engine to couple a second portion of the gas turbine engine to the pylon, the third mounting means defining a second line of action with the second mounting means, an intersection of the first line of action and the second line of action disposed an opposite side of a centerline of the gas turbine engine as the pylon.

Example 42 includes the apparatus of any preceding clause, wherein the first portion is a fan case and the second portion is an intermediate case disposed downstream of the fan case and a booster case.

Example 43 includes the apparatus of any preceding clause, wherein a first end of the first mounting means is coupled to the fan case and a second end of the first mounting means is coupled to the pylon.

Example 44 includes the apparatus of any preceding clause, wherein a first end of the third mounting means is coupled to the intermediate case, and a second end of the third mounting means is disposed adjacent to the second mounting means.

Example 45 includes the apparatus of any preceding clause, wherein the third mounting means is to be subjected to a thrust load during a condition of the gas turbine engine, the intersection has a displacement from the centerline, the displacement defines a moment arm of a first moment associated the thrust load, and the first moment in an opposite direction to a second moment associated with a second load.

Example 46 includes the apparatus of any preceding clause, wherein the second load is an inlet load applied to an inlet of the gas turbine engine during the condition.

Example 47 includes the apparatus of any preceding clause, wherein the condition is takeoff.

Example 48 includes the apparatus of any preceding clause, wherein the first line of action forms a first angle with the centerline, the first angle between 90 degrees and 45 degrees.

Example 49 includes the apparatus of any preceding clause, wherein the second line of action forms a second angle with the centerline, the second angle less than 20 degrees.

Example 50 includes the apparatus of any preceding clause, wherein the condition is the minimum clearance condition.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A gas turbine engine defining a centerline, the gas turbine engine comprising:

a pylon;

an inlet to be subjected to an inlet load along an inlet load axis;

a case assembly including:

a fan case;

a booster case disposed downstream of the fan case; and an intermediate case disposed downstream of the fan case and the booster case;

a forward mount coupling the fan case to the pylon, the coupling of the forward mount to the pylon defining a first line of action;

an aft mount; and a thrust link coupling the intermediate case to the pylon, the thrust link defining a second line of action, an intersection of the first line of action and the second line of action disposed at least one of: (1) on the inlet load axis and the centerline, (2) downstream of the inlet load axis and beneath the centerline, or (3) upstream of the inlet load axis and above the centerline.

2. The gas turbine engine of claim 1, wherein a first end of the forward mount is coupled to the fan case and a second end of the forward mount is coupled to the pylon.

3. The gas turbine engine of claim 1, wherein a first end of the thrust link is coupled to the intermediate case, and a second end of the thrust link is disposed adjacent to the aft mount.

4. The gas turbine engine of claim 1, wherein the thrust link is configured to be subjected to a thrust load during a condition of the gas turbine engine, the intersection has a displacement from the centerline, the displacement defines a moment arm of a first moment associated the thrust load, and the first moment in an opposite rotational direction to a second moment associated with the inlet load.

5. The gas turbine engine of claim 4, wherein the condition is a takeoff condition.

6. The gas turbine engine of claim 4, wherein the first moment is to cause a first reaction force at the aft mount, the second moment is to cause a second reaction force at the aft mount, the first reaction force in an opposite direction as the second reaction force.

7. The gas turbine engine of claim 1, wherein the forward mount includes an outlet guide vane.

8. The gas turbine engine of claim 7, wherein the outlet guide vane forms an acute angle with the centerline.

9. The gas turbine engine of claim 1, wherein the intersection is outside of the gas turbine engine.

10. An apparatus to couple a gas turbine engine to a pylon, the gas turbine engine having a centerline, the gas turbine engine to be subjected to an inlet load along an inlet load axis, the apparatus comprising:

a forward mount to couple a fan case of the gas turbine engine to the pylon along a first line of action;

an aft mount; and a thrust link configured to couple a intermediate case of the gas turbine engine to the pylon, the intermediate case disposed downstream of the fan case and a booster case of the gas turbine engine, the booster case disposed downstream of the fan case, the thrust link defining a second line of action, an intersection of the first line of action and the second line of action disposed at least one of: (1) on the inlet load axis and the centerline, (2) downstream of the inlet load axis and beneath the centerline, or (3) upstream of the inlet load axis and above the centerline.

11. The apparatus of claim 10, wherein a first end of the forward mount is coupled to the fan case and a second end of the forward mount is coupled to the pylon.

12. The apparatus of claim 10, wherein a first end of the thrust link is coupled to the intermediate case, and a second end of the thrust link is disposed adjacent to the aft mount.

13. The apparatus of claim 10, wherein the thrust link is configured to be subjected to a thrust load during a condition of the gas turbine engine, the intersection has a displacement from the centerline, the displacement defines a moment arm of a first moment associated the thrust load, and the first moment in an opposite rotational direction to a second moment associated with the inlet load.

14. The apparatus of claim 13, wherein the condition is a takeoff condition.

15. The apparatus of claim 13, wherein the first moment is to cause a first reaction force at the aft mount, the second moment is to cause a second reaction force at the aft mount, the first reaction force in an opposite direction as the second reaction force.

16. The apparatus of claim 10, wherein the forward mount includes an outlet guide vane.

17. The apparatus of claim 16, wherein the outlet guide vane forms an acute angle with the centerline.

18. The apparatus of claim 10, wherein the intersection is outside of the gas turbine engine.

* * * * *